United States Patent
Todd et al.

(10) Patent No.: US 9,594,546 B1
(45) Date of Patent: Mar. 14, 2017

(54) GOVERNED APPLICATION DEPLOYMENT ON TRUSTED INFRASTRUCTURE

(71) Applicant: EMC Corporation, Hopkinton, MA (US)

(72) Inventors: Stephen Todd, Shrewsbury, MA (US); Nikhil Sharma, El Dorado Hills, CA (US); Said Tabet, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/610,191

(22) Filed: Jan. 30, 2015

(51) Int. Cl.
   G06F 9/44 (2006.01)
   G06F 9/445 (2006.01)
   G06F 21/00 (2013.01)
   H04L 29/08 (2006.01)

(52) U.S. Cl.
   CPC .............. G06F 8/60 (2013.01); G06F 8/71 (2013.01); G06F 21/00 (2013.01); H04L 67/10 (2013.01)

(58) Field of Classification Search
   CPC ............................... G06F 8/65; G06F 9/5055
   USPC .................................................. 717/168–178
   See application file for complete search history.

(56) References Cited

U.S. PATENT DOCUMENTS

| | | | |
|---|---|---|---|
| 7,343,601 B2 * | 3/2008 | Azagury ............... | G06F 8/61 707/999.202 |
| 7,752,437 B1 | 7/2010 | Thakur et al. | |
| 8,010,426 B2 | 8/2011 | Kopp et al. | |
| 8,671,449 B1 | 3/2014 | Nachenberg | |
| 8,706,692 B1 | 4/2014 | Luthra et al. | |
| 8,756,656 B1 | 6/2014 | Hartmann | |
| 8,904,299 B1 | 12/2014 | Owen et al. | |
| 8,972,564 B1 | 3/2015 | Allen | |
| 9,256,656 B2 | 2/2016 | Fankhauser et al. | |
| 2004/0243692 A1 | 12/2004 | Arnold et al. | |
| 2005/0108703 A1 * | 5/2005 | Hellier ................... | 717/174 |

(Continued)

OTHER PUBLICATIONS

P. Mell et al., "The NIST Definition of Cloud Computing: Recommendations of the National Institute of Standards and Technology," Special Publication 800-145, Sep. 2011, 7 pages.

(Continued)

*Primary Examiner* — Wei Zhen
*Assistant Examiner* — Brahim Bourzik
(74) *Attorney, Agent, or Firm* — Ryan, Mason & Lewis, LLP

(57) ABSTRACT

Techniques are disclosed for governed or constrained deployment of one or more applications on trusted infrastructure of a cloud infrastructure environment. For example, a repository of metadata (e.g., metadata lake) is maintained. The metadata repository includes metadata associated with applications, metadata associated with content associated with the applications, and metadata associated with a cloud infrastructure environment in which the applications are deployable. A deployment is determined for a given application on a trusted infrastructure within the cloud infrastructure environment based on at least a subset of the metadata maintained in the metadata repository. The determination of the deployment of the given application based on the subset of the metadata includes mapping trust-based criteria associated with the given application with a portion of infrastructure of the cloud infrastructure environment that satisfies the trust-based criteria.

19 Claims, 11 Drawing Sheets

(56) References Cited

U.S. PATENT DOCUMENTS

| | | | |
|---|---|---|---|
| 2008/0091747 A1 | 4/2008 | Prahlad et al. | |
| 2008/0107037 A1 | 5/2008 | Forbes et al. | |
| 2008/0134332 A1 | 6/2008 | Keohane et al. | |
| 2010/0076987 A1 | 3/2010 | Schreiner | |
| 2010/0250867 A1 | 9/2010 | Bettger et al. | |
| 2010/0332530 A1 | 12/2010 | McKelvie et al. | |
| 2011/0153727 A1* | 6/2011 | Li | G06F 9/5055 709/203 |
| 2011/0179110 A1* | 7/2011 | Soloway | G06F 17/30292 709/203 |
| 2011/0191562 A1 | 8/2011 | Chou et al. | |
| 2011/0231899 A1* | 9/2011 | Pulier et al. | 726/1 |
| 2012/0254115 A1 | 10/2012 | Varadharajan | |
| 2014/0019423 A1 | 1/2014 | Liensberger et al. | |
| 2015/0127660 A1 | 5/2015 | Zilberberg et al. | |
| 2015/0378788 A1 | 12/2015 | Roese et al. | |

OTHER PUBLICATIONS

P. Banerjee et al., "The Future of Cloud Computing: An HP Labs Perspective," HP Labs Technical Reports, Dec. 2010, 11 pages.

C. Dai et al., "An Approach to Evaluate Data Trustworthiness Based on Data Provenance," Proceedings of the 5th VLDB Workshop on Secure Data Management (SDM '08), Aug. 2008, pp. 82-98.

P. De Leusse et al., "Toward Governance of Cross-Cloud Application Deployment," Second Optimising Cloud Services Workshop, Mar. 2012, 12 pages.

A. Gehani et al., "Mendel: Efficiently Verifying the Lineage of Data Modified in Multiple Trust Domains," Proceedings of the 19th ACM International Symposium on High Performance Distributed Computing (HPDC '10), Jun. 2010, 13 pages.

M.T. Jones, "Anatomy of a Cloud Storage Infrastructure," http://www.ibm.com/developerworks/cloud/library/cl-cloudstorage, Nov. 2010, 7 pages.

S. Pearson, "Privacy, Security and Trust in Cloud Computing," HP Labs Technical Reports, Jun. 2012, pp. 1-57.

U.S. Appl. No. 14/674,121, filed in the name of Stephen Todd et al. Mar. 31, 2015 and entitled "Lineage-Based Veracity for Data Repositories."

U.S. Appl. No. 14/674,218, filed in the name of Nikhil Sharma et al. Mar. 31, 2015 and entitled "Use of Trust Characteristics of Storage Infrastructure in Data Repositories."

U.S. Appl. No. 14/744,886, filed in the name of Marina Zeldin et al. Jun. 19, 2015 and entitled "Infrastructure Trust Index."

EMC, "EMC Centera Content—Addressable Storage—Archiving Made Simple, Affordable and Secure," http://www.emc.com/collateral/hardware/data-sheet/c931-emc-centera-cas-ds.pdf, May 2013, 4 pages.

\* cited by examiner

400

500

700

800

1000

1100

GOVERNED APPLICATION DEPLOYMENT ON TRUSTED INFRASTRUCTURE

FIELD

The field relates generally to cloud infrastructure environments, and more particularly to governed deployment of one or more applications on trusted infrastructure of a cloud infrastructure environment.

BACKGROUND

Many data centers in use today employ a cloud computing paradigm. As is well known, the cloud computing paradigm is a model that provides ubiquitous, convenient, on-demand network access to a shared pool of configurable computing resources (e.g., networks, servers, storage, applications, and services), as part of a cloud infrastructure, that can be rapidly provisioned and released with minimal management effort or service provider interaction (see, e.g., NIST Special Publication No. 800-145).

Application deployment on such a cloud infrastructure has been substantially automated by the development and implementation of tools that employ a Platform-as-a-Service (PaaS) approach. One example of such a PaaS approach is implemented in the CloudFoundry® product available from Pivotal Software, Inc. (Palo Alto, Calif.), which provides application developers with the functionality of a versatile PaaS application deployment layer. One of the main benefits of the PaaS application deployment layer is that, by controlling deployment of an application to a specific platform (e.g., specific data center or cloud), the PaaS application layer abstracts the application developer away from the specific hardware architecture of the data center/cloud where the application is intended to be deployed. This increases development speed and also facilitates speed of deployment for information technology (IT) operators.

SUMMARY

Embodiments of the invention provide techniques for governed deployment of one or more applications on trusted infrastructure of a cloud infrastructure environment.

For example, in one embodiment, a repository of metadata is maintained. The metadata repository comprises metadata associated with applications, metadata associated with content associated with the applications, and metadata associated with a cloud infrastructure environment in which the applications are deployable. A deployment is determined for a given application on a trusted infrastructure within the cloud infrastructure environment based on at least a subset of the metadata maintained in the metadata repository. The determination of the deployment of the given application based on the subset of the metadata comprises mapping trust-based criteria associated with the given application with a portion of infrastructure of the cloud infrastructure environment that satisfies the trust-based criteria.

Advantageously, illustrative embodiments realize that application developers may have reasons to have their applications deployed on infrastructure which is trusted. For example, such applications may involve policies, requirements, and other criteria relating to financial services, data protection, data retention, government regulations, etc. While applications with such criteria clearly have one or more reasons to be deployed on cloud infrastructure that is trusted, existing PaaS application deployment tools are unable to make such placement decisions. Illustrative embodiments therefore enable an understanding of the policy needs or regulatory requirements (i.e., trust-based criteria) of an application which results in governed or constrained placement of the application onto a specific cloud with a certain trusted infrastructure within that cloud. This is accomplished, in one or more illustrative embodiments, by maintaining metadata associated with the infrastructure and metadata associated with the application and its associated content, and finding a best-fit (mapping) for the application on a specific part of the infrastructure to satisfy the policies and/or requirements of the application. Such a best-fit mapping also enables generation and processing of queries to discover specific data sets (and schemas) and the infrastructure onto which the data sets have been assigned. In illustrative embodiments, the metadata is maintained in a metadata storage repository called a "metadata lake."

These and other features and advantages of the invention will become more readily apparent from the accompanying drawings and the following detailed description.

DETAILED DESCRIPTION

Figure 1:
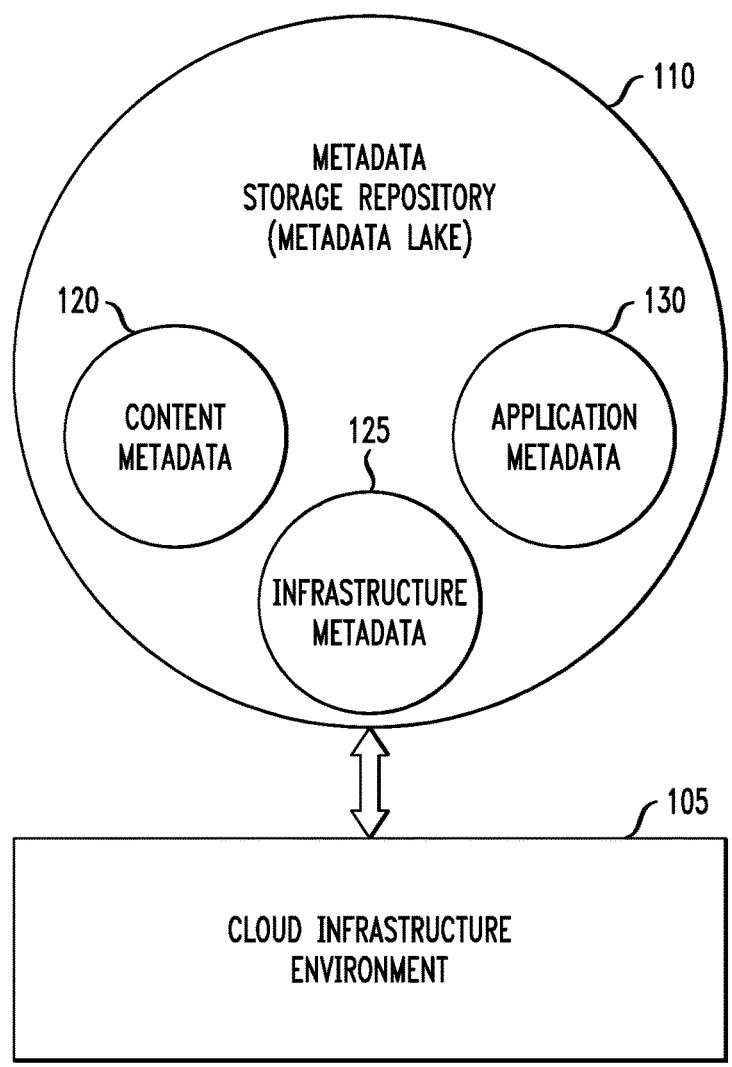
FIG. 1 illustrates a metadata storage repository for use with a cloud infrastructure environment to enable governed deployment of one or more applications on trusted infrastructure of the environment, according to an embodiment of the invention.

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" generally refers to one or more software programs designed to perform one or more functions; "metadata" generally refers to data that describes or defines other data; "governed placement" generally refers to constraining deployment of an application on specific infrastructure that is trusted; and "trusted" generally means satisfying (or at least substantially satisfying) or being consistent with one or more trust-based criteria (e.g., policies, requirements, regulations, etc.).

It is realized herein that limitations of existing application deployment approaches have to do with these existing approaches' failure to recognize the importance of data and metadata governance in entities such as large corporations. While the automated deployment of applications continues to be critical, embodiments of the invention have been developed based on the realization that there is a need/desire to constrain application deployment to run on top of specific trusted and compliant infrastructure, as well as a need/desire to subsequently discover such trusted infrastructure for analytic queries.

Application deployment via PaaS tools, such as CloudFoundry® and, as another example, OpenShift® (Red Hat, Inc. of Raleigh, N.C.), typically limit the deployment of an application to a specific cloud, without understanding the capabilities of the underlying infrastructure. A typical cloud selection process for deploying an application, illustrated using CloudFoundry® as an example, is as follows:

1—deploy <my cloud>
2—target <my cloud>
3—push <my app>
4—bind <my services>
5—instances <my app>+100
6—add_capacity <my cloud>

In this example, the data center operator that manages the cloud infrastructure issues commands 1 and 6 of the process, while the application developer issues commands 2 through 5. Thus, as is evident, the application developer is automatically assigned a cloud ("my cloud") which is some portion of the cloud infrastructure that constitutes a data center. The application developer can specify services that the application will need as well as how many instances of the application will run on the assigned cloud. The data center operator then issues commands to add resource capacity to the assigned cloud and to deploy the application instance(s) to the assigned cloud for execution.

However, as is evident from the above example, the existing PaaS deployment process has no mechanism for understanding the policies or regulatory requirements of an application that may need to result in constrained placement onto a specific cloud with a certain trusted infrastructure within that cloud. As mentioned above, such a constrained (or governed) placement may be needed/desired based on application criteria such as, but not limited to, policies, requirements, and other criteria relating to, e.g., financial services, data protection, data retention, government regulations, etc.

Even if a PaaS tool were to have disparate knowledge of specific trusted infrastructure and disparate knowledge of policy constraints of the application that it must place, existing PaaS tools have no ability to automatically and dynamically map those two pieces of information on the fly (real-time) at deployment time. Illustrative embodiments of the invention provide such mapping functionality.

Furthermore, it is realized herein that corporate discovery and analysis of data sets is hindered due to the fact that existing PaaS tools cannot be queried to discover specific data sets and the infrastructure onto which they have been assigned. This limits the ability of corporate personnel and officers (e.g., chief data officer) to quickly leverage data for business objectives. Illustrative embodiments of the invention provide such querying functionality.

It is also realized herein that the metadata that an existing PaaS tool such as CloudFoundry® would need to solve the above problems is fragmented across disparate silos (of the underlying data center) and often difficult to access, implemented in various formats, and possibly with a different meaning within each silo. That is, due to the heterogeneous nature of the data needed to make the decision, as well as the disparate locations where such data is stored, existing PaaS tools are unable to perform governed deployment of one or more applications on trusted infrastructure of a cloud infrastructure environment.

Illustrative embodiments of the invention maintain a metadata storage repository called a "metadata lake" whereby metadata associated with the cloud infrastructure environment is collected for use in making governed placement decisions. For example, FIG. 1 illustrates a system 100 comprising a metadata storage repository 110 (also referred to as "metadata lake" 110) and a cloud infrastructure environment 105, wherein the repository 110 enables governed deployment of one or more applications on trusted infrastructure of the environment 105, as will be described in detail below. The metadata lake 110 informs a PaaS tool, such as, e.g., CloudFoundry® and OpenShift®, on the application and infrastructure metadata that provides for automated, governed deployment of applications onto a best-fit trusted infrastructure. This metadata lake 110 is accessible at both application deployment time as well as discovery time when a specific data storage unit or device needs to be discovered and analyzed.

The metadata lake 110 contains a combination of semantic (content) metadata 120, infrastructure-based metadata 125, and application metadata 130. Thus, metadata 120 is considered metadata associated with content associated with applications, metadata 125 is considered metadata associated with a cloud infrastructure environment in which the applications are deployable, and metadata 130 is considered metadata associated with the applications. The metadata lake 110 comprises a portal (e.g., one or more application programming interfaces or APIs, not expressly shown) that accept metadata 120 about semantic content (e.g., discovered, aggregated, or manually supplied), infrastructure-based metadata 125 (e.g., gathered automatically from software-defined data center interfaces and tools), and application metadata 130 (e.g. schemas, regulations, and policies supplied, by way of example only, by Chief Security Officers/Chief Data Officers/others) from various sources, systems, tools and/or processes, as will be further explained below.

It is to be appreciated that the phrase "cloud infrastructure environment" as illustratively used herein generally refers to an environment that comprises cloud infrastructure and a platform stack used for development, management, and deployment of applications hosted by computing resources that are part of the cloud infrastructure. The cloud infrastructure in one embodiment comprises an infrastructure-as-a-service (IaaS) approach with a plurality of clouds that form a plurality of data centers (e.g., software defined data centers or SDDCs). The platform stack in one embodiment comprises development and management layers that form a programming environment for an application developer, and a platform-as-a-service (PaaS) deployment layer to deploy developed applications.

Figure 2:
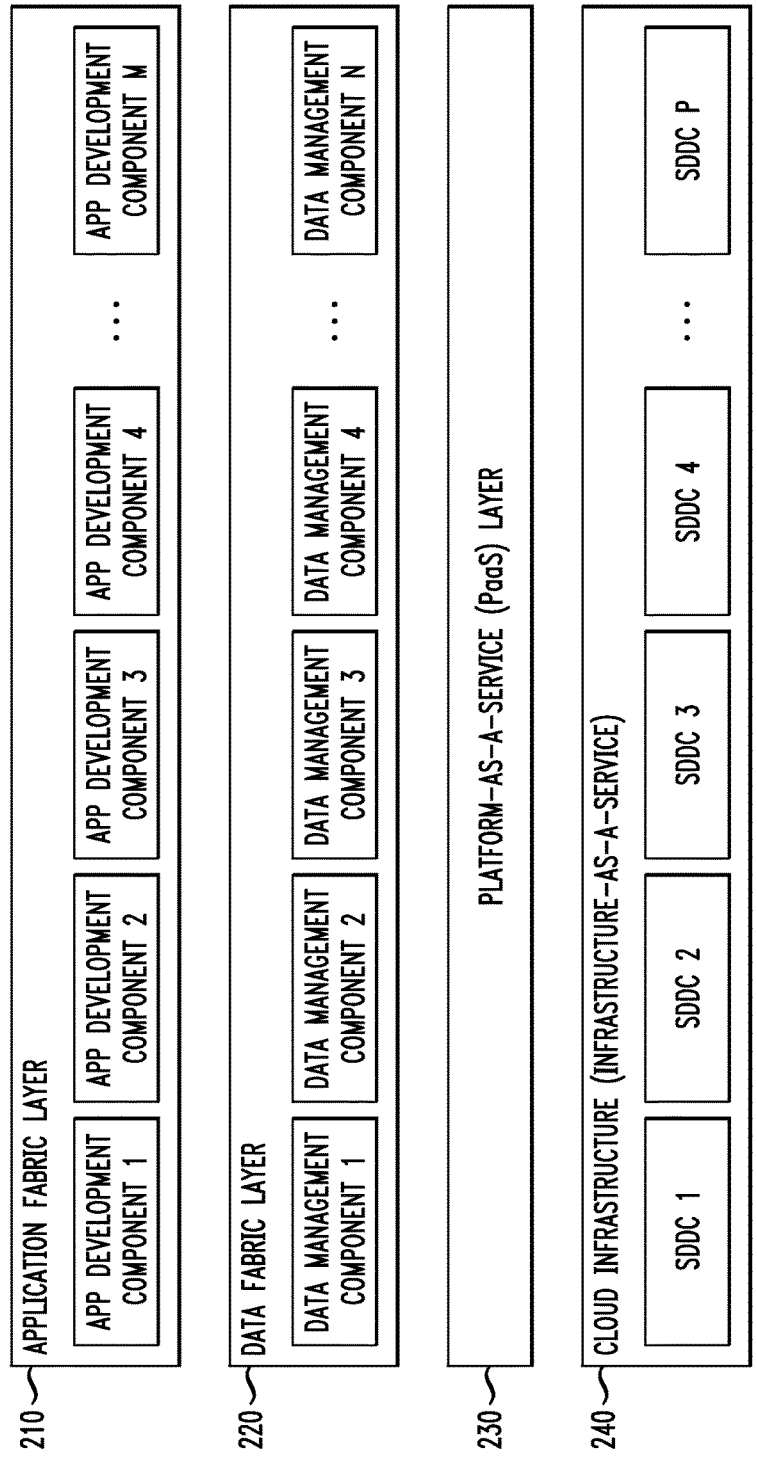
FIG. 2 illustrates a platform stack in a cloud infrastructure environment with platform-as-a-service functionality with which a metadata storage repository according to one or more embodiments of the invention can be implemented.

FIG. 2 illustrates one example of a platform stack in a cloud infrastructure environment with PaaS functionality with which a metadata storage repository according to one or more embodiments of the invention can be implemented. More specifically, system 200 in FIG. 2 illustrates one example of at least a portion of the environment 105 shown in FIG. 1. As shown, system 200 comprises an application fabric layer 210 with a plurality of application development components 1, 2, 3, 4, . . . M, a data fabric layer 220 with a plurality of data management components 1, 2, 3, 4, . . . N, a PaaS layer 230, and a cloud infrastructure 240 which utilizes an IaaS approach including a plurality of SDDCs 1, 2, 3, 4, . . . P. Each SDDC may comprise one or more clouds, each cloud having its own underlying infrastructure (by way of example only, networks, servers, storage devices, virtualization functionality including virtual machines and logical storage units, etc.).

As is known, while the PaaS layer controls deployment of an application to a specific platform (e.g., specific data center or cloud) and thus abstracts the application developer away from the underlying infrastructure of the data center/cloud where the application is to be deployed, IaaS can be used in illustrative embodiments to assist in selecting the underlying infrastructure.

It is to be appreciated that the application development components in the application fabric layer 210 may comprise any known application development tools depending on the specific applications to be developed and hosted on the data center. By way of example only, these application development tools may include one or more of: mobile software development tools from Xtreme Labs® (part of Pivotal Software, Inc. of Palo Alto, Calif.); open source web application framework Rails® (David Heinemeier Hansson); Java Virtual Machine (JVM) based application development Spring® tools (Pivotal Software, Inc. of Palo Alto, Calif.); data intensive real-time application development system Node.js® (Joyent, Inc. of San Francisco, Calif.); and cloud application vFabric® platform (VMware, Inc. of Palo Alto, Calif.), just to name a few.

Likewise, the data management components in the data fabric layer 220 may comprise any known data management tools depending on the specific applications to be developed and hosted on a data center/cloud. By way of example only, these data management tools may include one or more of: massively parallel processing (MPP) structured query language (SQL) database Pivotal HD® (Pivotal Software, Inc. of Palo Alto, Calif.); query interface software HAWQ® (Pivotal Software, Inc. of Palo Alto, Calif.); and data management software GemFire® (Pivotal Software, Inc. of Palo Alto, Calif.), just to name a few.

The PaaS layer 230 may comprise any known PaaS tool, by way of example as mentioned above, CloudFoundry® and OpenShift®. One or more other PaaS tools may be employed by the PaaS layer 230.

The cloud infrastructure layer 240, in one example, comprises a plurality of SDDCs. An SDDC is a data center design where elements of the infrastructure (e.g., including networking elements, storage elements, processing elements, and security elements) are virtualized and delivered as services (e.g., IaaS) to tenants. Typically, each SDDC is implemented via a specific cloud where part or all of infrastructure associated with the cloud is allocated to one or more tenants. A "cloud" generally refers to a portion of infrastructure and associated environment that operates in accordance with a cloud computing paradigm. It is to be appreciated, however, that alternative embodiments may be implemented with other types of data centers and processing platforms.

Figure 3:
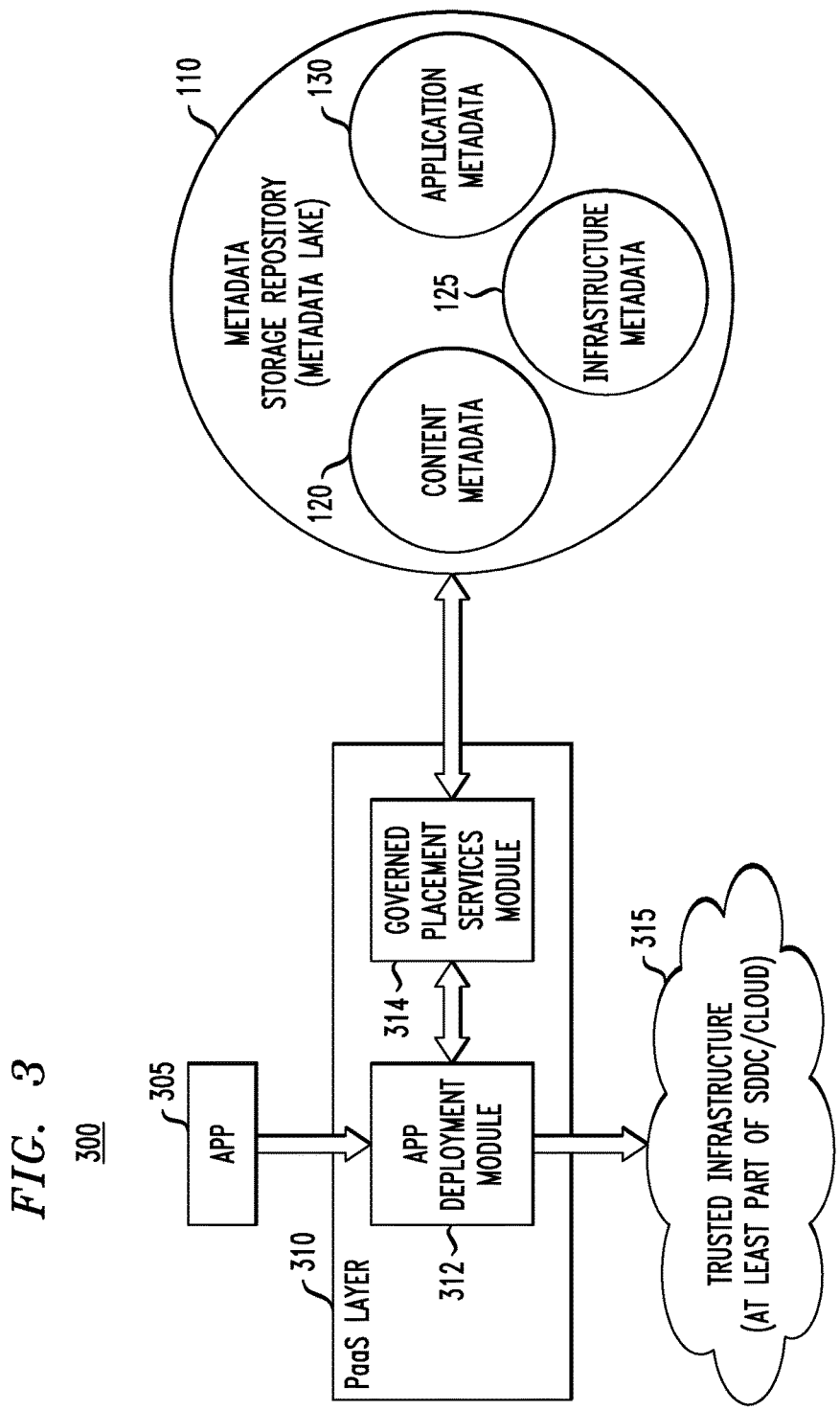
FIG. 3 illustrates application deployment via governed placement services according to an embodiment of the invention.

FIG. 3 illustrates application deployment via governed placement services according to an embodiment of the invention. As shown in system 300 of FIG. 3, an application 305 is provided to a PaaS layer 310. The PaaS layer 310 is one example of PaaS layer 230 (FIG. 2), and application 305 is an example of an application developed in accordance with application fabric layer 210 and data fabric layer 220 (FIG. 2). The application developer seeks to have application 305 deployed on trusted infrastructure due to some trust-based criteria such as policy, requirement, regulation, or the like, associated with the application. As explained above, existing PaaS tools are not able to take into account such trust-based criteria or identify which cloud infrastructure would be able to best satisfy such criteria, nor map the two pieces of information to one another.

In accordance with one embodiment, PaaS layer 310, in conjunction with metadata lake 110, is configured to determine a deployment for application 305 on a trusted infrastructure within the cloud infrastructure environment based on at least a subset of the metadata maintained in the metadata repository. This is accomplished with application deployment module 312 and governed placement services module 314. More particularly, a request to deploy application 305 is presented to application deployment module 312. Application deployment module 312 calls governed placement services module 314 which determines the deployment of application 305 based on a subset of the metadata (e.g., content metadata 120, infrastructure metadata 125, application metadata 130) stored in metadata lake 110 by mapping trust-based criteria (e.g., policies, requirements, regulations, etc.) associated with application 305 with a portion of infrastructure that satisfies the trust-based criteria, in this example, trusted infrastructure 315 which includes some portion or all infrastructure of an SDDC or cloud of the cloud infrastructure 240.

More particularly, governed placement services module 314 queries the metadata lake 110 for information useful in identifying placement on a trusted infrastructure. Governed placement services module 314 comprises logic configured to interpret one or more policies (e.g., corporate policies) for the application and map the one or more policies against available trusted infrastructure for the purpose of deploying the application and its associated data on top of the trusted infrastructure. Such logic can be encoded in various ways including, but not limited to, using semantic tools and rule-based declarative approaches. Illustrative embodiments will be described below.

Once a placement decision is made by governed placement services module 314, module 314 notifies application deployment module 312 which, in turn, deploys the application on the identified trusted infrastructure 315. The metadata lake 110 is also notified of the placement decision by module 314. Metadata lake 110 stores this information which serves as an audit trail for subsequent query services. The recording of this data may be done by tools such as a PaaS tool or an underlying SDDC entity.

It is to be appreciated that while system 300 of FIG. 3 shows governed placement services module 314 being internal to the PaaS layer 310, in alternative embodiments, all or part of the functionality of governed placement services module 314 may be implemented via the computing resources that implement metadata lake 110 and/or some other computing resources (not expressly shown) in communication with PaaS layer 310 and metadata lake 110.

Figure 4:
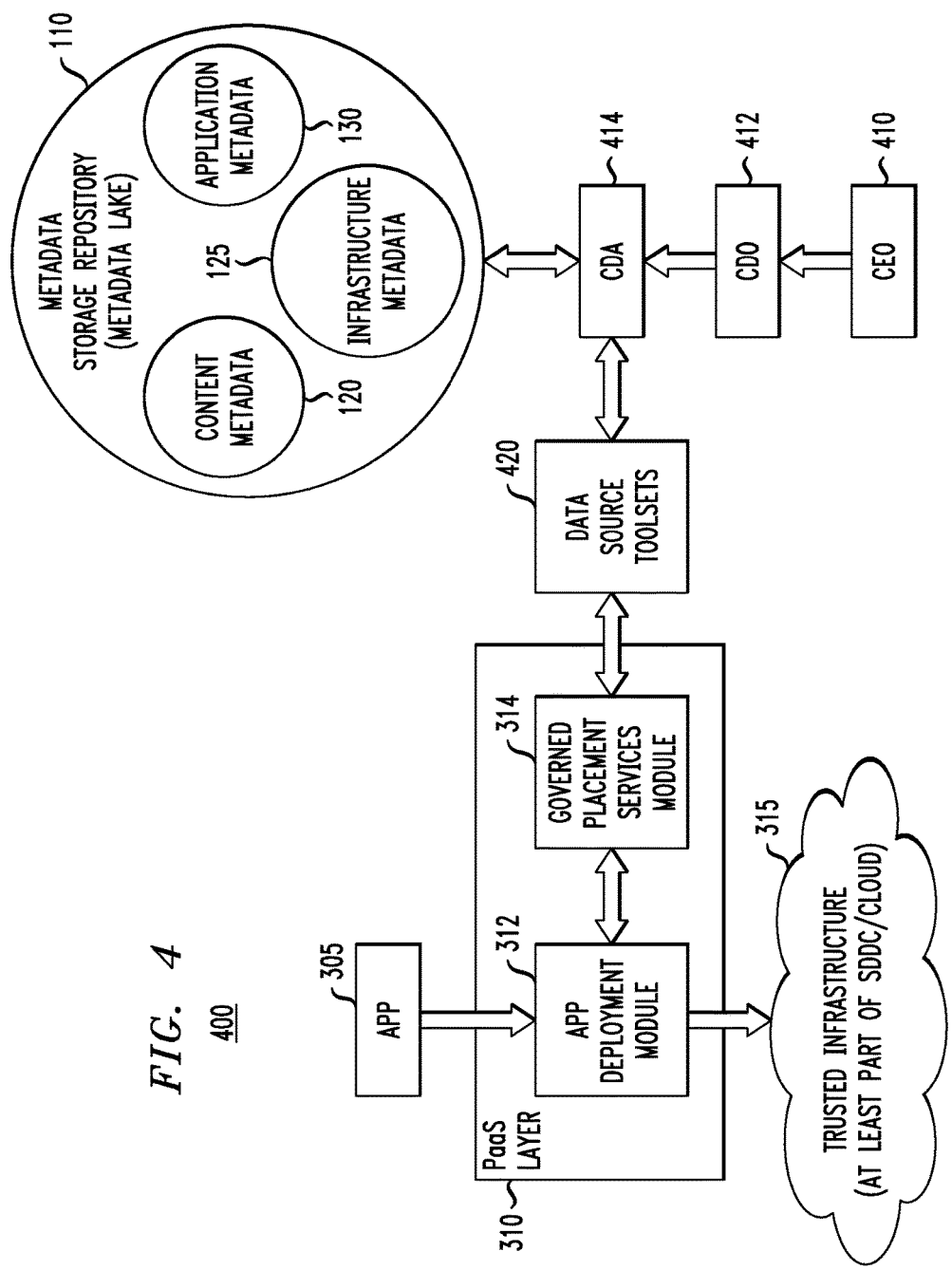
FIG. 4 illustrates application deployment via governed placement services according to another embodiment of the invention.

It is further realized herein that an SDDC platform likely hosts millions of applications, and trying to quickly extract value out of data associated with those many applications can be severely constricted by the ability to query the PaaS layer to determine where, in a geographically distributed cloud infrastructure, specific applications and/or data stores are assigned within the infrastructure. FIG. 4 illustrates application deployment via governed placement services according to one embodiment that addresses this and other such discovery issues. More particularly, system 400 employs a similar architecture as described above for system 300 (FIG. 3) with the exception that application and/or data store dynamic discovery services with rich semantics are added to speed up the query and location process and make it more efficient. This CDO (chief data officer) architecture 400 includes data source toolsets 420 which can be accessed by employees that work for corporate officers and personnel (e.g., chief executive officer or CEO 410, CDO 412, and/or chief data architect or CDA 414). The data source toolsets 420 are used by one or more of employees to submit one or more queries to the governed placement services module 314 of the PaaS layer 310 and/or the metadata lake 110 (assuming an audit trail of governed placement is maintained therein) to determine where, in the geographically distributed cloud infrastructure (240), specific applications are deployed and what trusted computing resources (e.g., data stores) are mapped (or assigned) to those applications.

Thus, in the non-limiting example shown in FIG. 4, it is assumed that CEO 410 poses one or more business questions to CDO 412 who then poses one or more data questions intended to answer the one or more business questions to CDA 414. CDA 414 then employs the data source toolsets 420 to get answers to the one or more data questions. Examples of data source toolsets include, but are not limited to, a structured query language (SQL) query, NoSQL ("not only" SQL) APIs, Java APIs, representational state transfer (REST) APIs, etc.

We will now explain some illustrative scenarios and methodologies whereby various types of metadata maintained by metadata lake 110 are collected and stored in the context of FIGS. 5-10.

Figure 5:
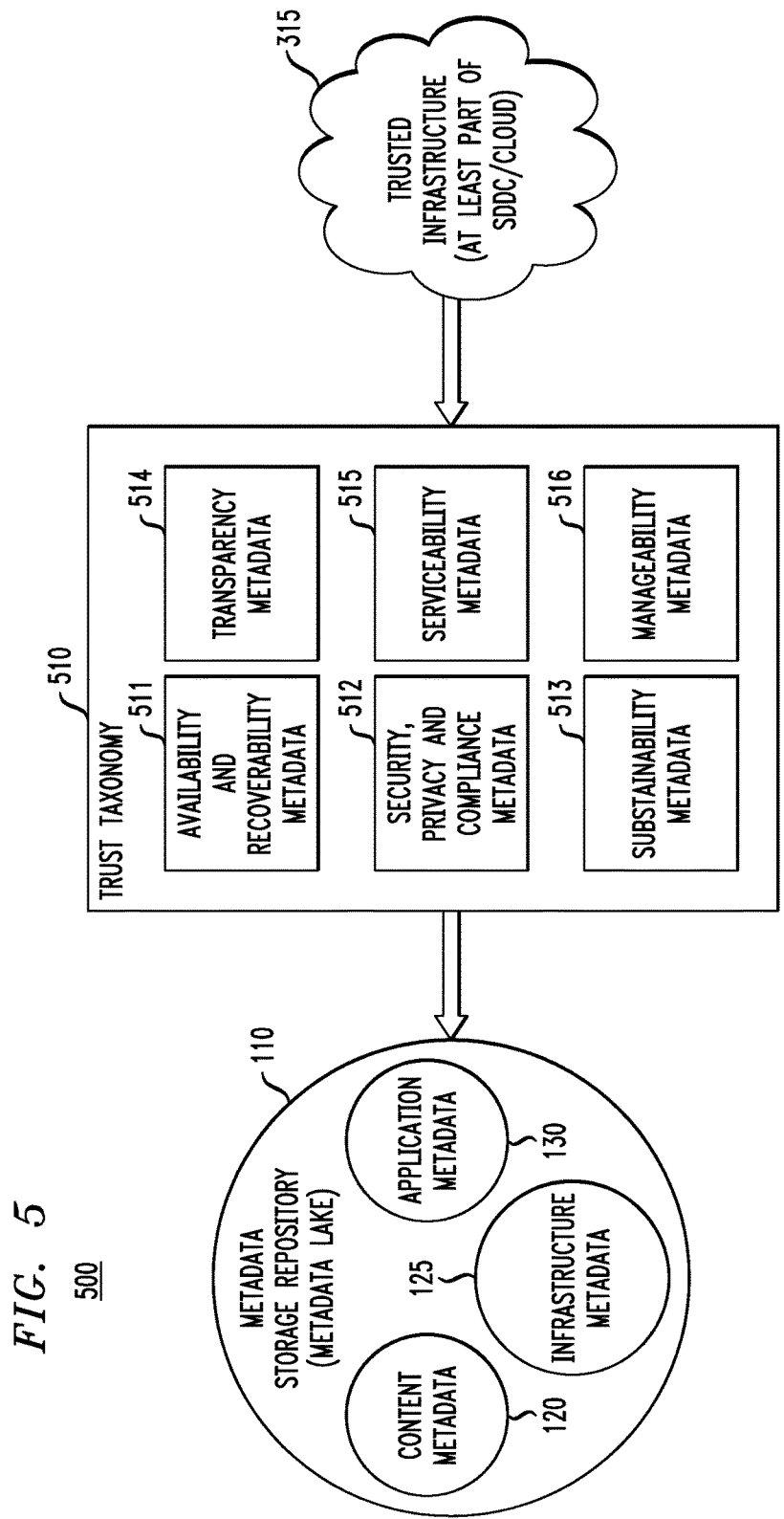
FIG. 5 illustrates a trust taxonomy generated in a metadata storage repository according to an embodiment of the invention.

FIG. 5 illustrates a trust taxonomy generated in a metadata storage repository according to an embodiment of the invention. More particularly, scenario 500 illustrates trusted infrastructure 315 supplying metadata describing its trust capabilities to metadata lake 110. These trust capabilities are defined as one or more trust dimensions and, in this embodiment, comprise: (i) availability and recoverability; (ii) security, privacy and compliance; (iii) sustainability; (iv) transparency, (v) serviceability, and (vi) manageability. Thus, as shown in trust taxonomy 510, these dimensions are expressed as: availability and recoverability metadata 511; security, privacy and compliance metadata 512; sustainability metadata 513; transparency metadata 514; serviceability metadata 515; and manageability metadata 516.

More specifically, availability and recoverability metadata 511 comprises statistics or other metrics that describe and/or quantify the trusted infrastructure's ability to perform its agreed upon function(s) when required, as well as its ability to recover from failure(s). Security, privacy and compliance metadata 512 comprises statistics or other metrics that describe and/or quantify the trusted infrastructure's ability to ensure confidentiality, integrity and compliance of data and infrastructure. Sustainability metadata 513 comprises statistics or other metrics that describe and/or quantify the trusted infrastructure's ability to enable increased power and/or energy efficiencies and ensure ethical practices. Transparency metadata 514 comprises statistics or other metrics that describe and/or quantify the trusted infrastructure's ability to provide standardized access to customer operational reports and reporting against trust objectives. Serviceability metadata 515 comprises statistics or other metrics that describe and/or quantify the trusted infrastructure's ability to facilitate technical support and problem resolution. Manageability metadata 516 comprises statistics or other metrics that describe and/or quantify the trusted infrastructure's ability to enable automation and interoperability in managing trust-based criteria.

Figure 6:
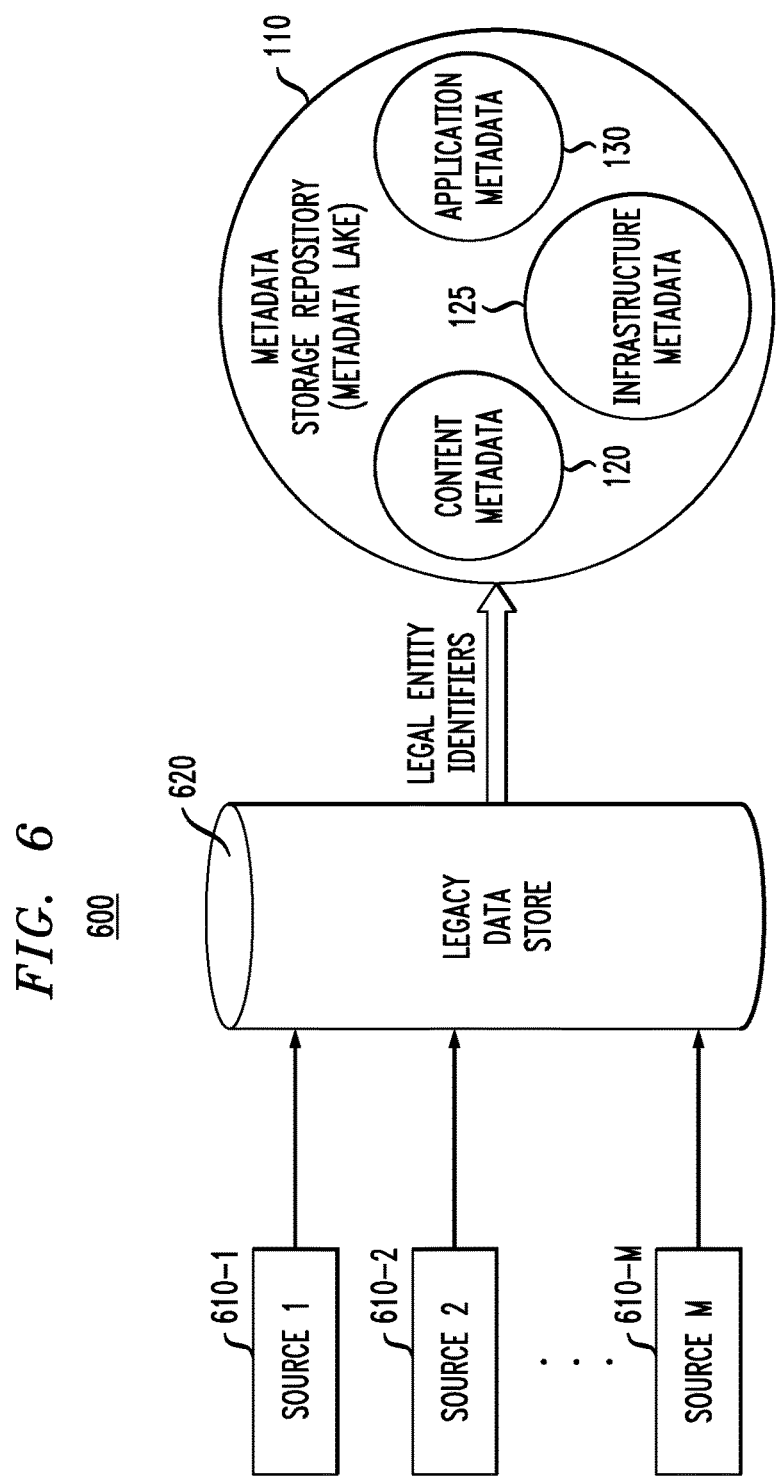
FIG. 6 illustrates legacy discovery and legal entity identification in a metadata storage repository according to an embodiment of the invention.

FIG. 6 illustrates legacy discovery and legal entity identification in a metadata storage repository according to an embodiment of the invention. In accordance with the embodiment depicted in scenario 600, existing data stores in an enterprise can be semantically discovered and a unique Legal Entity Identifier (LEI) created. This discovery and ID creation can be accomplished via a scalable technology such as that available from Global IDs (Princeton, N.J.) or the like. Thus, as shown in FIG. 6, a plurality of data sources 610-1, 610-2, . . . 610-M supply data to a legacy data store 620. It is assumed that the data sources 610-1, 610-2, . . . 610-M and the legacy data store 620 each have assigned thereto a unique LEI. These LEIs are discovered and stored as part of the metadata in metadata lake 110. In this manner, an enterprise (e.g., corporation or business) can identify and scan data sources, data stores and databases that are representative of the overall legacy data ecosystem they are seeking to manage as part of the metadata repository system.

Figure 7:
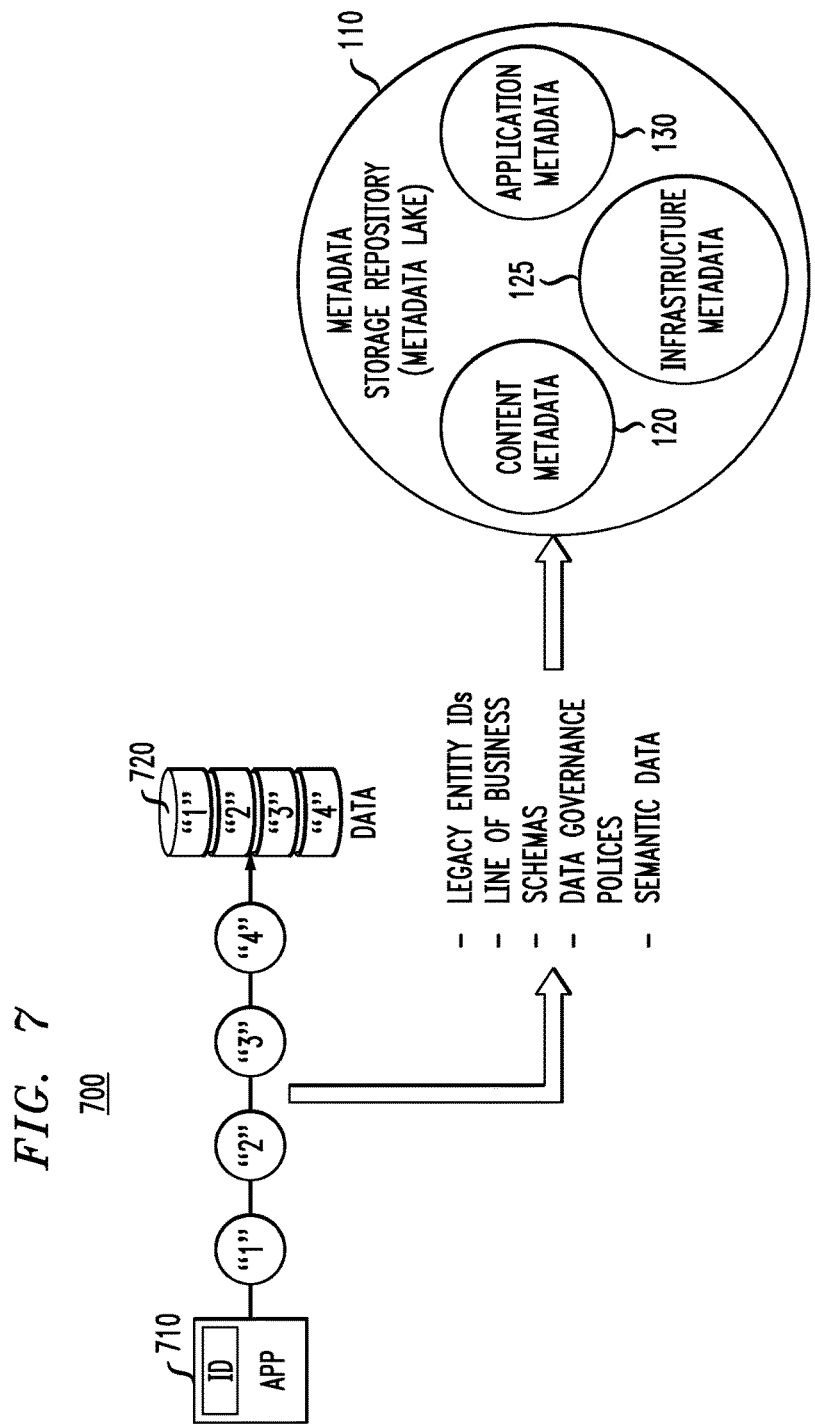
FIG. 7 illustrates storing application governance information in a metadata storage repository according to an embodiment of the invention.

FIG. 7 illustrates storing application governance information in a metadata storage repository according to an embodiment of the invention. More particularly, scenario 700 illustrates an embodiment whereby application policy information (e.g., schemas, line of business, data sensitivity, data governance policies, semantic, etc.) is generated for a specific LEI and recorded in metadata lake 110. In this manner, policies of application 710 (part of application metadata 130) are mapped with information about data content 720 (part of content metadata 120) associated with application 710, and stored in metadata lake 110.

Figure 8:
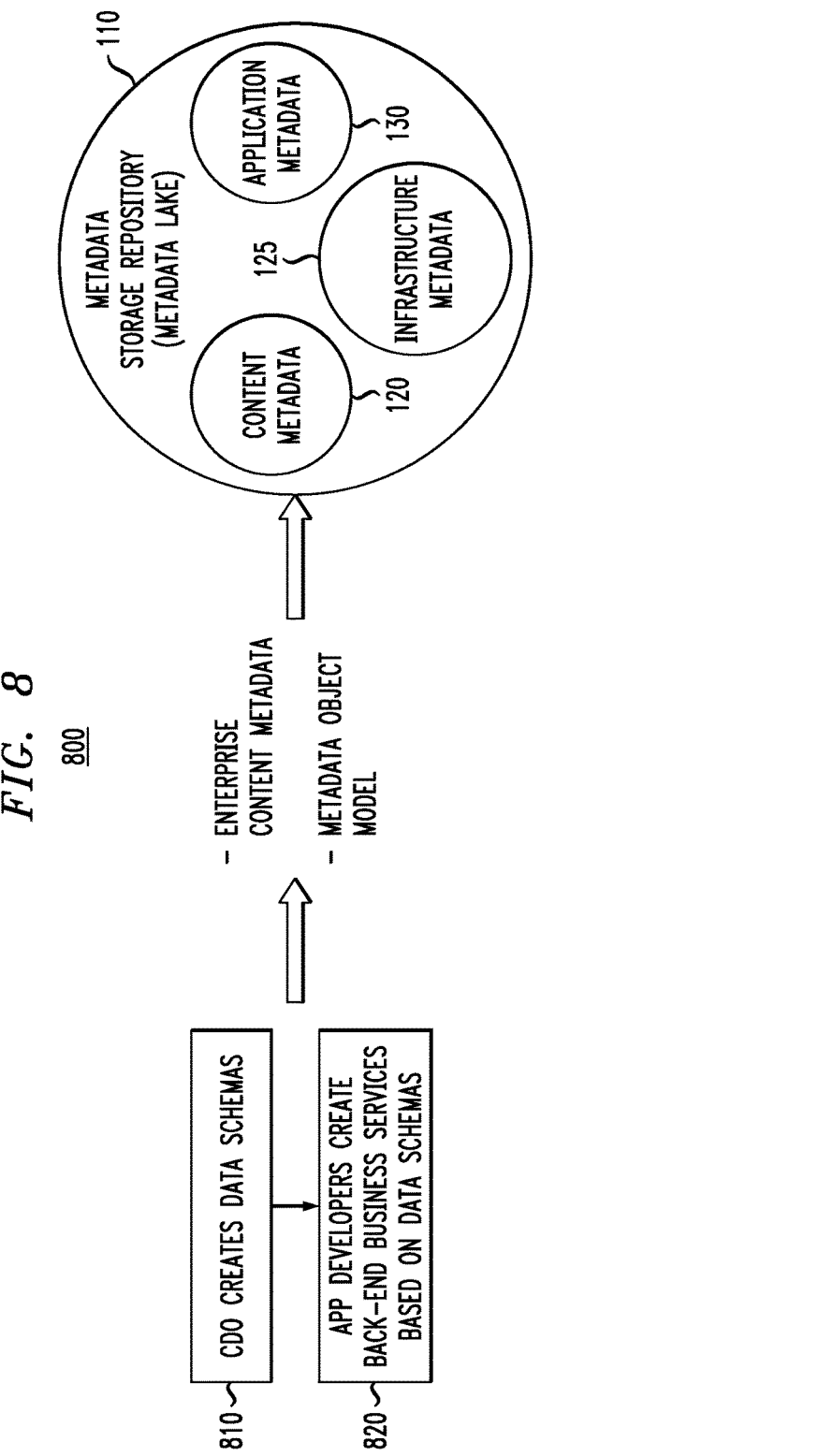
FIG. 8 illustrates storing corporate data schema information in a metadata storage repository according to an embodiment of the invention.

FIG. 8 illustrates storing corporate data schema information in a metadata storage repository according to an embodiment of the invention. More particularly, it is realized herein that any new application development uses data schemas (e.g. created by a CDO) that have well-defined corporate policies associated therewith. Whether using Pivotal® products, Documentum® (available from EMC Corporation of Hopkinton, Mass.), or other application service frameworks for application development (or both), an end result is metadata about the content itself. In accordance with one embodiment, shown as scenario 800 in FIG. 8, this content metadata is added to metadata lake 110 along with the LEIs of applications that leverage the data schemas.

Thus, as shown in step 810, the CDO creates one or more data schemas. In step 820, one or more application developers create back-end business services based on the one or more data schemas created by the CDO. As a result, both enterprise content metadata and a metadata object model are stored in metadata lake 110.

Figure 9:
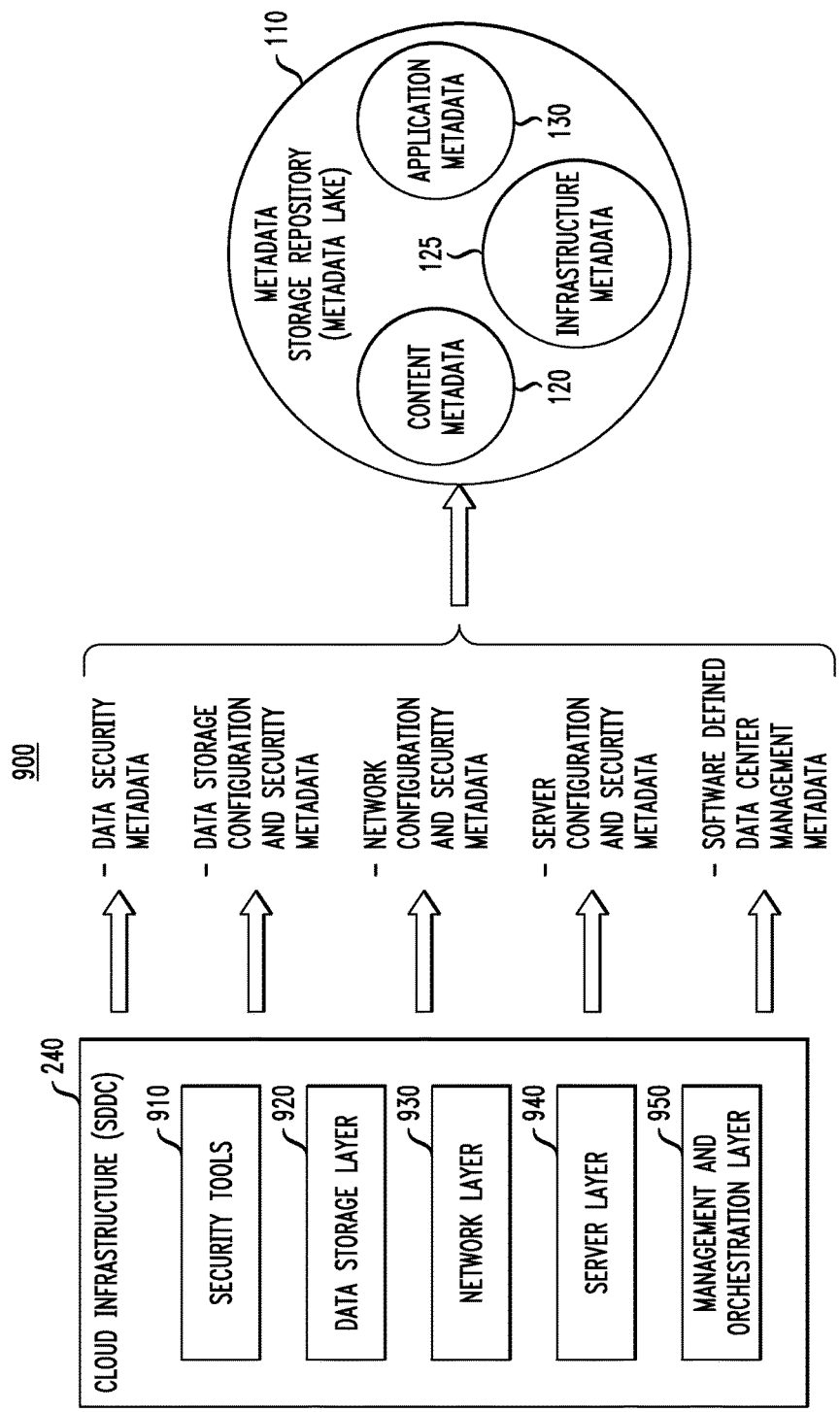
FIG. 9 illustrates storing security and configuration information in a metadata storage repository according to an embodiment of the invention.

FIG. 9 illustrates storing security and configuration information in a metadata storage repository according to an embodiment of the invention. In scenario 900 shown in the embodiment of FIG. 9, tools within SDDC 240 are instructed to route infrastructure-based metadata to the metadata lake (stored as infrastructure metadata 125). This metadata includes, but is not limited to, data security metadata from one or more security tools 910 (e.g., traces from Netwitness® security tool available from EMC Corporation of Hopkinton, Mass.), data storage configuration and security metadata from a data storage layer 920 of SDDC 240 (e.g., metadata from ViPR® available from EMC Corporation of Hopkinton, Mass.), network configuration and security metadata from a network layer 930 of SDDC 240, server configuration and security metadata from a server layer 940 of SDDC 240, and management metadata from a management and orchestration layer 950 of SDDC 240.

Figure 10:
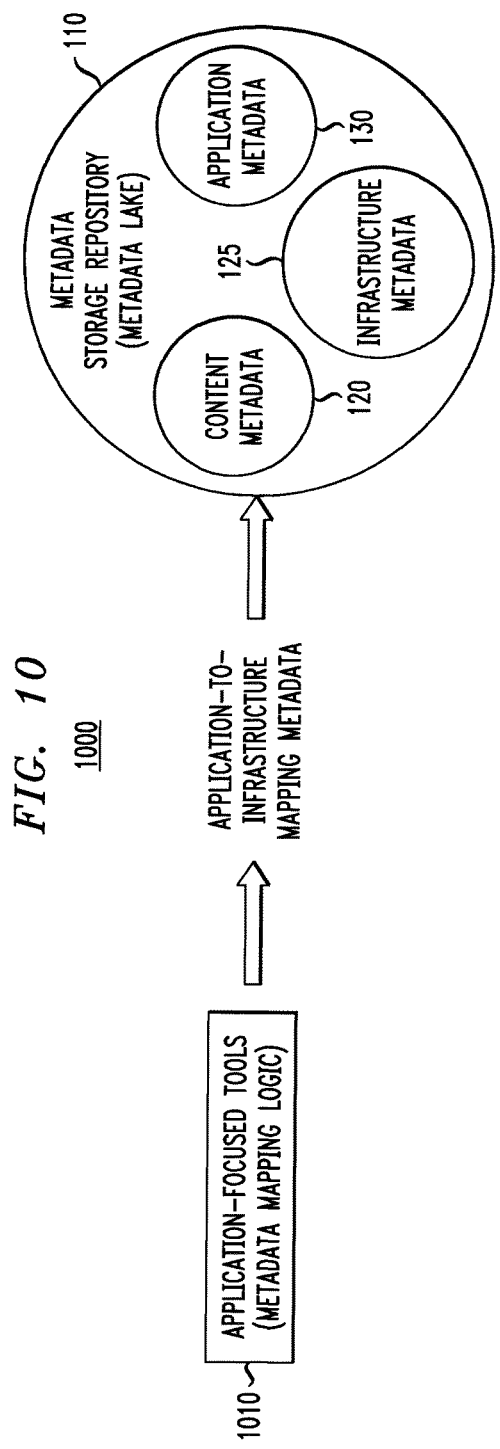
FIG. 10 illustrates storing application-to-infrastructure information in a metadata storage repository according to an embodiment of the invention.

FIG. 10 illustrates storing application-to-infrastructure information in a metadata storage repository according to an embodiment of the invention. In scenario 1000 of the embodiment shown in FIG. 10, it is realized that any tools that understand or interpret the mapping of applications to infrastructure can also map this data to the metadata lake 110. For example, data protection tools have rich metadata in this regard, and service tools such as Adaptivity® (available from EMC Corporation of Hopkinton, Mass.) can be used to discover applications and their current mapping to infrastructure. Thus, as shown in FIG. 10, one or more application-focused tools 1010 (such as those illustratively mentioned above) generate application-to-infrastructure mapping metadata which is stored in metadata lake 110. This mapping metadata may be used by governed placement services module 314 (FIG. 3) to make best-fit determinations for constrained placement of applications. Also, in alternative embodiments, such application-focused tools 1010 can be integrated as part of the governed placement service module 314.

Given the one or more scenarios and methodologies illustratively described herein for collecting and storing metadata as part of metadata lake 110, those ordinarily skilled in the art will realize various use cases for such functionality. It is to be appreciated that embodiments of the invention are not limited to these illustrative use cases and that many other use cases are intended to be within the scope of embodiments of the invention.

Figure 11:
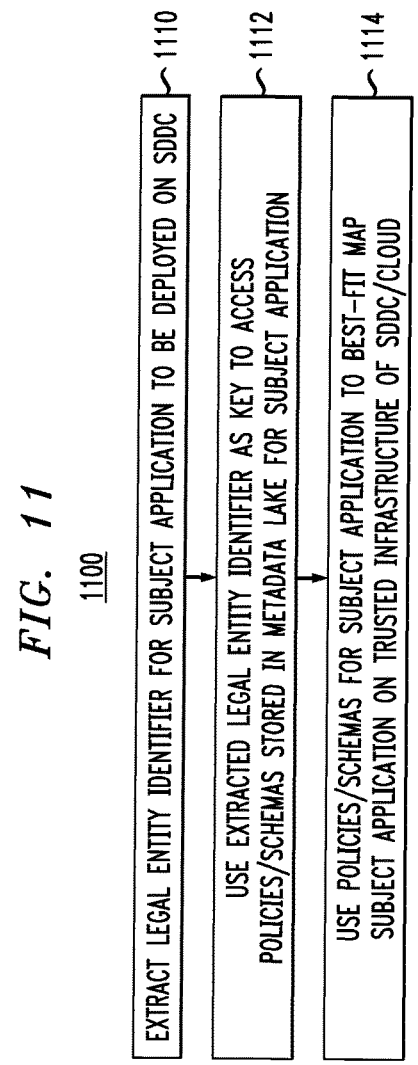
FIG. 11 illustrates using a legal entity identifier as a key to access information in a metadata storage repository according to an embodiment of the invention.

FIG. 11 illustrates using a legal entity identifier (LEI) as a key to access information in a metadata storage repository according to an embodiment of the invention. Using LEI techniques described above, applications deployed or deployable via a PaaS layer 310 each have a unique identifier associated therewith.

Accordingly, as shown in step 1110 of methodology 1100, the unique LEI is extracted from a subject application by the PaaS layer (e.g., application deployment module 312) and provided to governed placement services module 314. In step 1112, the extracted LEI is used by governed placement services module 314 as a key to access policies and schemas (metadata 120 and 130) stored in metadata lake 110 for that subject application. In step 1114, the policies and schemas are used for the subject application to best-fit map the subject application on trusted infrastructure of at least one of the SDDCs/clouds based on infrastructure metadata (125) also accessed in metadata lake 110.

One example to demonstrate the above process is as follows. Assume an organization has a policy to encrypt all sensitive data with the AES-256 standard. This policy may be due to a regulatory requirement or internal policy of an organization. A query into the application metadata (e.g., metadata 130 in FIG. 1) states that Application A, that is required to be provisioned, stores revenue data of the organization, which is marked sensitive. Clearly this Application A will need to be provisioned on infrastructure with AES-256 encryption capability (i.e., example of trusted infrastructure). PaaS governed placement services module 314 discovers the storage infrastructure with AES-256 encryption capability (e.g., discovered from metadata 125 in FIG. 1) and PaaS application deployment module 312 subsequently provisions the application on the selected infrastructure. Subsequently, if a CDO queries the metadata lake 110 to show the characteristics of the infrastructure with sensitive data, the CDO will see Application A with sensitive revenue data being hosted in a storage infrastructure with AES-256 encryption capability.

Figure 12:
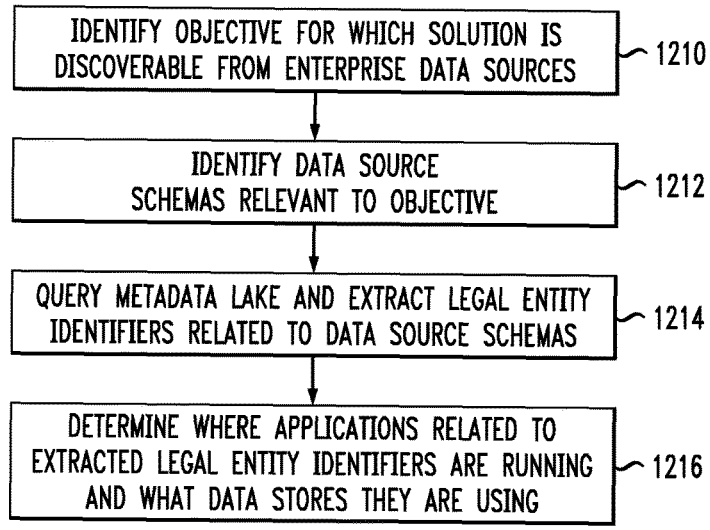
FIG. 12 illustrates querying a metadata storage repository to address a given business objective according to an embodiment of the invention.

FIG. 12 illustrates querying a metadata storage repository to address a given business objective according to an embodiment of the invention. Assume a CEO sets a goal to increase the customer base by 10 percent in the new year. The CDO needs to understand the current customer base and therefore needs to analyze any and all data stores/applications that interact with customers. The CDO relies on the CDA to use the corporate customer schemas to discover all relevant data stores and applications, and then assigns data scientists to those stores to determine how to reach the objective of increasing the customer base by 10 percent in the new year. This use case is depicted in methodology 1200.

As shown, step 1210 identifies the objective for which a solution is discoverable from enterprise data sources, e.g., increase customer base by 10 percent in the new year. Step 1212 identifies the data source schemas relevant to the objective. Step 1214 queries metadata lake 110 and extracts the LEIs relevant to the data source schemas. Then, in step 1216, the methodology determines where applications related to the extracted LEIs are running and what data stores they are using. By way of one example only, the data source toolsets 420 (FIG. 4) may be used to provide such dynamic discovery services.

It is to be appreciated that while the figures described above have depicted certain components as being internal or external to other components, embodiments of the invention are not limited to these illustrative depictions. By way of one example only, while metadata lake 110 is shown as being external to PaaS layer 310, it is to be appreciated that in alternative embodiments, metadata lake 110 may be implemented partially or wholly internal to PaaS layer 310. Likewise, any one or more of the components, modules, tools, layers, etc. described herein may be implemented internal or external to any other of the components, modules, tools, layers, data stores, etc.

Figure 13:
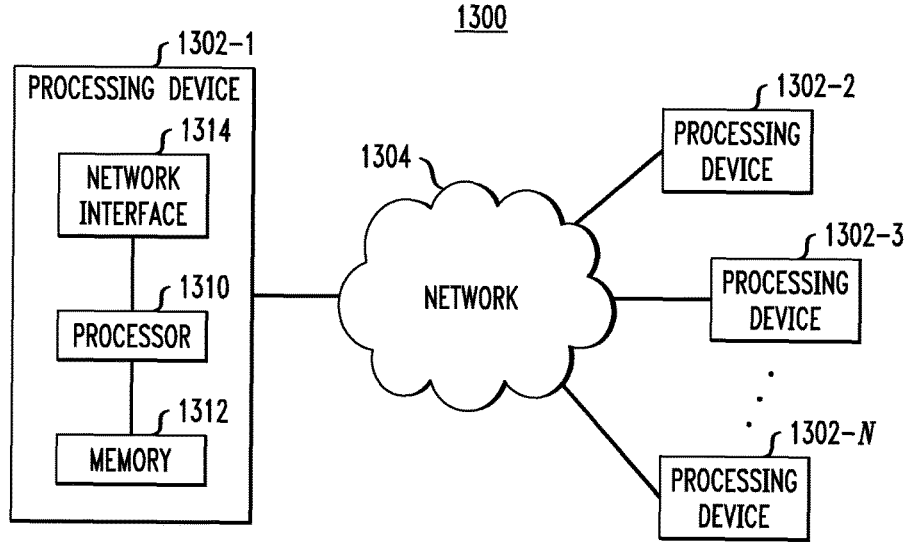
FIG. 13 illustrates a processing platform used to implement a metadata storage repository and cloud infrastructure environment according to an embodiment of the invention.

As an example of a processing platform on which a metadata storage repository and cloud infrastructure environment (e.g., 100 in FIG. 1) may be implemented is processing platform 1300 shown in FIG. 13. The processing platform 1300 in this embodiment comprises a plurality of processing devices, denoted 1302-1, 1302-2, 1302-3, . . . 1302-N, which communicate with one another over a network 1304. It is to be appreciated that the metadata storage and usage methodologies described herein may be executed in one such processing device 1302, or executed in a distributed manner across two or more such processing devices 1302. The cloud infrastructure environment may also be executed in a distributed manner across two or more such processing devices 1302. The metadata storage functionality and the data center/cloud functionality described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 13, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1302-1 in the processing platform 1300 comprises a processor 1310 coupled to a memory 1312. The processor 1310 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1310. Memory 1312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1312 may comprise electronic memory such as random access memory (RAM), read-only memory (ROM) or other types of memory, in any combination. The one or more software programs when executed by a processing device such as the processing device 1302-1 causes the device to perform functions associated with one or more of the components/steps of system/methodologies in FIGS. 1-12. One skilled in the art would be readily able to implement such software given the teachings provided herein. Other examples of processor-readable storage media embodying embodiments of the invention may include, for example, optical or magnetic disks.

Processing device 1302-1 also includes network interface circuitry 1314, which is used to interface the device with the network 1304 and other system components. Such circuitry may comprise conventional transceivers of a type well known in the art.

The other processing devices 1302 (1302-2, 1302-3, . . . 1302-N) of the processing platform 1300 are assumed to be configured in a manner similar to that shown for computing device 1302-1 in the figure.

The processing platform 1300 shown in FIG. 13 may comprise additional known components such as batch processing systems, parallel processing systems, physical machines, virtual machines, virtual switches, storage volumes, etc. Again, the particular processing platform shown in this figure is presented by way of example only, and the metadata storage repository and data center environment collectively shown as 100 in FIG. 1 may include additional or alternative processing platforms, as well as numerous distinct processing platforms in any combination.

Also, numerous other arrangements of servers, clients, computers, storage devices or other components are possible in processing platform 1300. Such components can communicate with other elements of the processing platform 1300 over any type of network, such as a wide area network (WAN), a local area network (LAN), a satellite network, a telephone or cable network, or various portions or combinations of these and other types of networks.

Furthermore, it is to be appreciated that the processing platform 1300 of FIG. 13 can comprise virtual machines (VMs) implemented using a hypervisor. A hypervisor is an example of what is more generally referred to herein as "virtualization infrastructure." The hypervisor runs on physical infrastructure. As such, the visualization techniques illustratively described herein can be provided in accordance with one or more cloud services. The cloud services thus run on respective ones of the virtual machines under the control of the hypervisor. Processing platform 1300 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1300 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX® (both available from EMC Corporation of Hopkinton, Mass.). A variety of other computing and storage products may be utilized to implement the one or more cloud services that provide the functionality and features described herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

maintaining a repository of metadata, wherein the metadata repository comprises metadata associated with applications, metadata associated with content associated with the applications, and metadata associated with a cloud infrastructure environment in which the applications are deployable; and determining a deployment for a given application on a trusted infrastructure within the cloud infrastructure environment based on at least a subset of the metadata maintained in the metadata repository, wherein determining the deployment of the given application based on the subset of the metadata comprises mapping trust-based criteria associated with the given application with a given portion of infrastructure of the cloud infrastructure environment that satisfies the trust-based criteria;

wherein the maintaining and determining steps are executed by one or more processing devices;

wherein maintaining the repository of metadata comprises:

obtaining information describing trust capabilities of respective portions of the cloud infrastructure environment;

generating trust taxonomies for respective ones of the portions of the cloud infrastructure environment based on the obtained information; and storing the trust taxonomies for respective portions of the cloud infrastructure in the metadata repository as at least a portion of the metadata associated with the cloud infrastructure environment in which the applications are deployable; and wherein determining the deployment for the given application on the trusted infrastructure comprises:

extracting a unique identifier for the given application in a platform-as-a-service layer of the cloud infrastructure environment, the platform-as-a-service layer being configured to abstract cloud infrastructure and to enable a user to deploy the given application in the given portion of the cloud infrastructure;

providing the extracted identifier to a governed placement service, the governed placement service utilizing the extracted identifier as a key for accessing policies and schemas for the given application from the applications metadata and content metadata of the metadata repository;

utilizing the policies and schemas to determine the trust-based criteria associated with the given application;

discovering one or more portions of the cloud infrastructure environment that satisfy the trust-based criteria associated with the given application from the cloud infrastructure metadata in the metadata repository, the cloud infrastructure metadata comprising information describing trust capabilities of different portions of the cloud infrastructure environment; and selecting the given portion of the cloud infrastructure from the discovered one or more portions of the cloud infrastructure environment.

2. The method of claim 1, further comprising deploying the given application on the trusted infrastructure.

3. The method of claim 2, further comprising recording information describing the deployment in the metadata repository.

4. The method of claim 1, wherein the trust-based criteria associated with the given application comprise at least one of a policy need and a regulatory requirement.

5. The method of claim 1, wherein the metadata associated with content associated with the applications comprises one or more data schemas defined for use in developing one or more applications.

6. The method of claim 1, further comprising querying the metadata repository to discover information describing existing deployments of one or more applications on one or more portions of trusted infrastructure.

7. The method of claim 6, wherein the metadata repository querying step further comprises discovering one or more data sets associated with the one or more applications.

8. The method of claim 7, wherein the metadata repository querying step further comprises discovering one or more data storage devices upon which the one or more data sets are stored.

9. The method of claim 1, wherein the trust capabilities are represented by one or more trust dimensions comprising: (i) availability and recoverability; (ii) security, privacy and compliance; (iii) sustainability; (iv) transparency; (v) serviceability; and (vi) manageability.

10. The method of claim 1, wherein the governed placement service is internal to the platform-as-a-service layer.

11. The method of claim 1, wherein the governed placement service is external to the platform-as-a-service layer.

12. The method of claim 1, wherein the cloud infrastructure comprises one or more software defined data centers, and each of the software defined data centers comprise one or more clouds.

13. A system comprising:

one or more processors operatively coupled to one or more memories configured to:

maintain a repository of metadata, wherein the metadata repository comprises metadata associated with applications, metadata associated with content associated with the applications, and metadata associated with a cloud infrastructure environment in which the applications are deployable; and determine a deployment for a given application on a trusted infrastructure within the cloud infrastructure environment based on at least a subset of the metadata maintained in the metadata repository, wherein determining the deployment of the given application based on the subset of the metadata comprises mapping trust-based criteria associated with the given application with a portion of infrastructure of the cloud infrastructure environment that satisfies the trust-based criteria, wherein maintaining the repository of metadata comprises:

obtaining information describing trust capabilities of respective portions of the cloud infrastructure environment;

generating trust taxonomies for respective ones of the portions of the cloud infrastructure environment based on the obtained information; and storing the trust taxonomies for respective portions of the cloud infrastructure in the metadata repository as at least a portion of the metadata associated with the cloud infrastructure environment in which the applications are deployable;

wherein the one or more processors are configured to determine the deployment for the given application on the trusted infrastructure by:

extracting a unique identifier for the given application in a platform-as-a-service layer of the cloud infrastructure environment, the platform-as-a-service layer being configured to abstract cloud infrastructure and to enable a user to deploy the given application in the given portion of the cloud infrastructure providing me extracted identifier to a governed placement service, me governed placement service utilizing the extracted identifier as a key for accessing policies and schemas for the given application from the applications metadata and content metadata of the metadata repository:

utilizing the policies and schemas to determine the trust-based criteria associated with the given application; discovering one or more portions of the cloud infrastructure environment that satisfy the trust-based criteria associated with the given application from the cloud infrastructure metadata in the metadata repository, the cloud infrastructure metadata comprising information describing trust capabilities of different portions of the cloud infrastructure environment; and selecting the given portion of the cloud infrastructure from the discovered one or more portions of the cloud infrastructure environment.

14. An article of manufacture comprising a non-transitory processor-readable storage medium having encoded therein executable code of one or more software programs, wherein the one or more software programs when executed by one or more processing devices implement steps of:

maintaining a repository of metadata, wherein the metadata repository comprises metadata associated with applications, metadata associated with content associated with the applications, and metadata associated with a cloud infrastructure environment in which the applications are deployable; and determining a deployment for a given application on a trusted infrastructure within the cloud infrastructure environment based on at least a subset of the metadata maintained in the metadata repository, wherein determining the deployment of the given application based on the subset of the metadata comprises mapping trust-based criteria associated with the given application with a portion of infrastructure of the cloud infrastructure environment that satisfies the trust-based criteria;

wherein maintaining the repository of metadata comprises:

obtaining information describing trust capabilities of respective portions of the cloud infrastructure environment;

generating trust taxonomies for respective ones of the portions of the cloud infrastructure environment based on the obtained information; and storing the trust taxonomies for respective portions of the cloud infrastructure in the metadata repository as at least a portion of the metadata associated with the cloud infrastructure environment in which the applications are deployable; and wherein determining the deployment for the given application on the trusted infrastructure comprises:

extracting a unique identifier for the given application in a platform-as-a-service layer of the cloud infrastructure environment, the platform-as-a-service layer being configured to abstract cloud infrastructure and to enable a user to deploy the given application in the given portion of the cloud infrastructure;

providing the extracted identifier to a governed placement service, the governed placement service utilizing the extracted identifier as a key for accessing policies and schemas for the given application from the applications metadata and content metadata of the metadata repository;

utilizing the policies and schemas to determine the trust-based criteria associated with the given application;

discovering one or more portions of the cloud infrastructure environment that satisfy the trust-based criteria associated with the given application from the cloud infrastructure metadata in the metadata repository, the cloud infrastructure metadata comprising information describing trust capabilities of different portions of the cloud infrastructure environment; and selecting the given portion of the cloud infrastructure from the discovered one or more portions of the cloud infrastructure environment.

15. The method of claim 1, wherein maintaining the repository of metadata comprises: semantically discovering one or more data sources and data stores of an enterprise; assigning unique identifiers to the discovered data sources, the discovered data stores and applications associated with the discovered data sources and the discovered data stores; and storing the unique identifiers in the metadata repository.

16. The method of claim 15, wherein maintaining the repository of metadata comprises:

generating application policy information for respective ones of the unique identifiers;

storing the application policy information in the metadata repository as at least a portion of the metadata associated with applications;

mapping the application policy information to one or more of the data sources and the data stores of the enterprise; and storing the mapped application policy information in the metadata repository as at least a portion of the metadata associated with content associated with the applications.

17. The method of claim 15, wherein maintaining the repository of metadata comprises;

generating enterprise content metadata based on application development utilizing one or more data schemas having associated therewith one or more defined policies;

generating a metadata object model using the unique identifiers, the metadata object model defining applications that leverage the one or more data schemas; and storing the enterprise content metadata and the metadata object model in the metadata repository as at least a portion of the metadata associated with applications and metadata associated with content associated with the applications.

18. The method of claim 1, wherein maintaining the repository of metadata comprises;

receiving data security metadata from one or more security tools associated with respective portions of the cloud infrastructure environment;

receiving data storage and configuration metadata from data storage layers associated with respective portions of the cloud infrastructure environment;

receiving network configuration and security metadata from network layers associated with respective portions of the cloud infrastructure environment, receiving server configuration and security metadata from server layers associated with respective portions of the cloud infrastructure environment;

receiving management metadata from management and orchestration layers associated with respective portions of the cloud infrastructure environment; and storing the data security metadata, data storage and configuration metadata, network configuration and security metadata, server configuration and security metadata and management metadata in the metadata repository as at least a portion of the metadata associated with the cloud infrastructure environment in which the applications are deployable.

19. The method of claim 1, wherein maintaining the repository of metadata comprises;
utilizing one or more application focused tools to generate application-to-infrastructure mapping metadata, the application-to-infrastructure mapping metadata comprising information on applications and their current mapping to infrastructure in the cloud infrastructure environment; and
storing the application-to-infrastructure mapping metadata in the metadata repository as at least a portion of the metadata associated with applications and the metadata associated with the cloud infrastructure environment in which the applications are deployable.

* * * * *